A. ODENBACH.
HORSE COLLAR.
APPLICATION FILED OCT. 25, 1919.
1,354,994.
Patented Oct. 5, 1920.
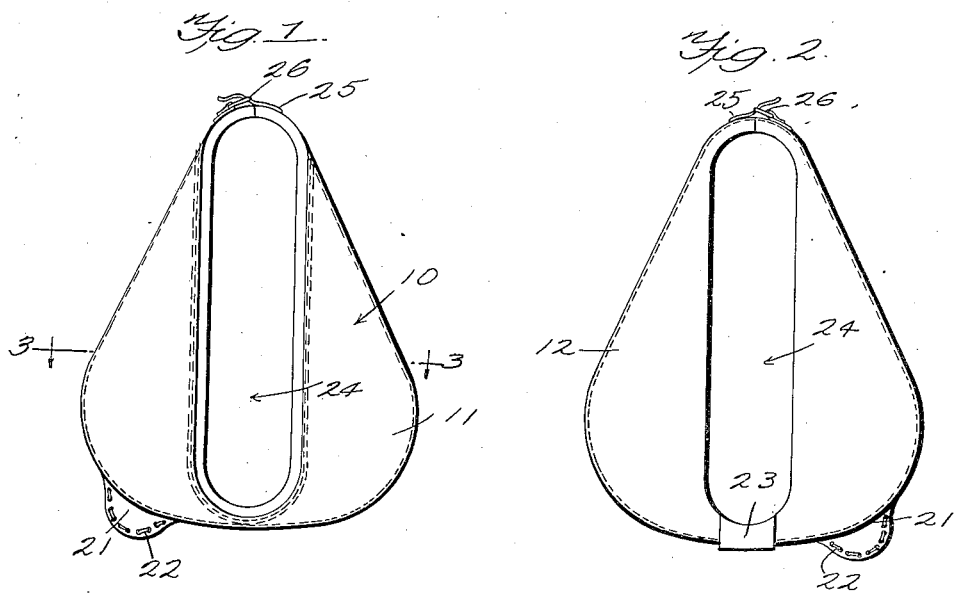
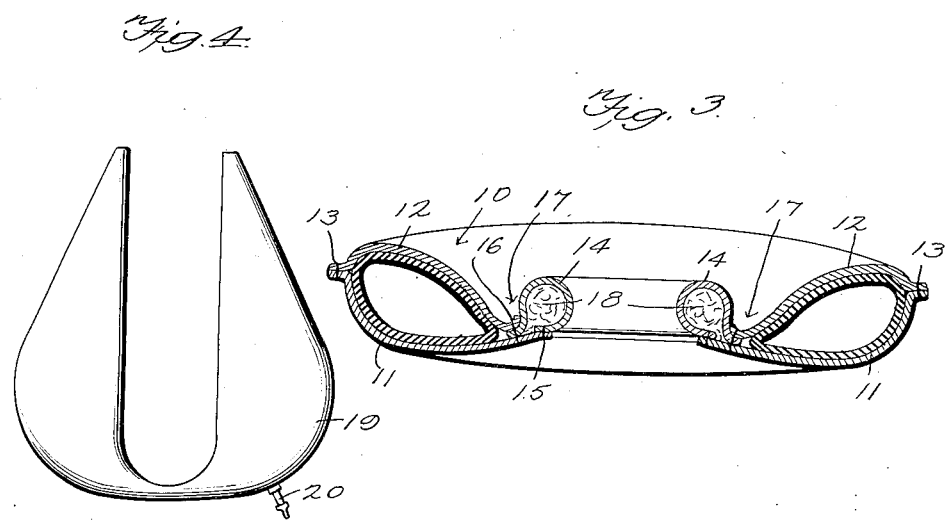
Inventor
Albert Odenbach,
By William A. Deane,
his Attorney

UNITED STATES PATENT OFFICE.

ALBERT ODENBACH, OF BONESTEEL, SOUTH DAKOTA, ASSIGNOR OF ONE-HALF TO JACOB SCHOCHENMAIER, OF BONESTEEL, SOUTH DAKOTA.

HORSE-COLLAR.

1,354,994. Specification of Letters Patent. Patented Oct. 5, 1920.

Application filed October 25, 1919. Serial No. 333,154.

*To all whom it may concern:*

Be it known that I, ALBERT ODENBACH, citizen of the United States, residing at Bonesteel, in the county of Gregory and State of South Dakota, have invented certain new and useful Improvements in Horse-Collars, of which the following is a specification, reference being had therein to the accompanying drawing.

My invention relates to horse collars and has particular reference to a horse collar embodying a sack or cell which is inflated with air.

An important object of the invention is to provide a horse collar of the above mentioned character, which will not rub or chafe the neck or shoulder of the horse and which is very comfortable in use.

A further object of the invention is to provide a horse collar of the above mentioned character, which is simple in construction, strong and durable.

Other objects and advantages of the invention will be apparent during the course of the following description.

In the accompanying drawings forming a part of this specification and in which like numerals are employed to designate like parts throughout the same, Figure 1 is a front elevation of a collar embodying my invention.

Fig. 2 is a rear elevation of the same,

Fig. 3 is a horizontal section taken on line 3—3 of Fig. 2,

Fig. 4 is a side elevation of the air bag or cell.

In the drawings, wherein for the purpose of illustration is shown a preferred embodiment of my invention, the numeral 10 designates the outer casing of the collar, as a whole, this casing embodying a rear section 11, preferably formed of leather, and a front section 12, also preferably formed of leather. These sections have their outer edges stitched together, as shown at 13.

The numeral 14 designates an inner strip, preferably formed of leather, which is arranged forwardly of the rear section 11, at its inner edge, and stitched thereto, as shown at 15. The section 14 has its forward outer edge arranged rearwardly of the inner edge of the forward section 12, and is stitched thereto, as shown at 16. The stitching 16 also extends through the rear section 11, which projects inwardly beyond the forward section 12. This stitching arrangement transversely curves the strip 14 into a roll or bead, providing a forward groove or recess 17, for the hames. The roll or bead is filled with fibrous material, such as straw 18.

The numeral 19 designates an approximately U-shaped air sack or cell, formed of rubber or the like, and adapted for insertion within the outer casing 10, outwardly of the bead, before the stitching 13 is made, in part or whole. This air sack is equipped with a valve 20, adapted for connection with a pump, so that air under pressure may be introduced into the sack. This valve 20 is inclosed within casing extensions 21, the edges of which may be secured together, at 22, by stitching or lacing. It is preferable that this connection be detachable.

At the lower end of the collar, I preferably provide a reinforcing strip 23, of leather or the like, secured thereto by any suitable means.

The upper ends of the collar are separate, so that the horse's neck may be introduced into the opening 24 of the collar. A strap 25 is secured to one end of the collar, at the top thereof, and is adapted to engage with a buckle 26, carried by the other end.

In the use of the collar, the same is applied to the horse's neck, in the usual manner, and should it be desired to increase the volume of air within the collar, the same may be done by uncovering the valve and connecting it with a pump. The hames are arranged within the grooves or recesses 17, and act upon the inflated collar, as the horse drags the load. By providing the collar with the air filled sack or cell, the action of the same is obtained and a collar provided having the desired degree of resiliency, which may be regulated to suit each particular horse or the draft conditions.

It is to be understood that the form of my invention herewith shown and described is to be taken as a preferred example of the same, and that various changes in the shape, size, and arrangement of parts may be resorted to without departing from the spirit of the invention or the scope of the subjoined claims:

Having thus described my invention, I claim:

1. A horse collar of the character described, comprising an outer casing, including a rear section and a forward section having their inner and outer edges permanently stitched together, an air sack arranged within the casing and having a valve projecting outwardly beyond the same, a pair of flexible extensions secured to the front and rear sections and covering the valve, and means for detachably securing the edges of the extensions together.

2. A horse collar of the character described, comprising an outer casing including a rear section and a forward section, extensions carried by said sections at the outer edges thereof, stitching for securing the inner and outer edges of the sections together, a cell arranged within the casing and having a valve projecting outwardly of the same between the extensions, and means for detachably securing the edges of the extensions together.

In testimony whereof I hereunto affix my signature in the presence of two witnesses.

ALBERT ODENBACH.

Witnesses:
B. C. MAYNARD,
B. J. HINGEUST.